US005494949A

United States Patent [19]

Kinkel et al.

[11] Patent Number: 5,494,949

[45] Date of Patent: Feb. 27, 1996

[54] SURFACE-MODIFIED OXIDE PARTICLES AND THEIR USE AS FILLERS AND MODIFYING AGENTS IN POLYMER MATERIALS

[75] Inventors: Joachim Kinkel, Guldental; Kurt Marquard, Reinheim; Ludwig Pohl, Darmstadt, all of Germany

[73] Assignees: Merck Patent Gesellschaft Mit Beschrankter Haftung, Darmstadt; Hoechst Aktiengesellschaft, Frankfurt am Main, both of Germany

[21] Appl. No.: 244,517

[22] PCT Filed: Sep. 23, 1993

[86] PCT No.: PCT/EP93/02579

§ 371 Date: Jun. 1, 1994

§ 102(e) Date: Jun. 1, 1994

[87] PCT Pub. No.: WO94/07948

PCT Pub. Date: Apr. 14, 1994

[30] Foreign Application Priority Data

Oct. 5, 1992 [DE] Germany .......................... 42 33 396.2

[51] Int. Cl.$^{6}$ ................................ C08K 9/06; C08K 3/22

[52] U.S. Cl. .......................... 523/212; 523/213; 523/505; 523/521; 528/41; 524/264; 524/265; 524/493; 428/405

[58] Field of Search .................................... 524/265, 264, 524/493; 523/212, 213, 505, 521; 528/41; 428/405

[56] References Cited

U.S. PATENT DOCUMENTS

| | | | |
|---|---|---|---|
| 4,176,124 | 11/1979 | Darms et al. | 560/19 |
| 4,328,041 | 5/1982 | Wilson | 106/447 |
| 4,395,507 | 7/1983 | Dziark et al. | 523/212 |
| 4,482,655 | 11/1984 | Wilson | 523/212 |
| 4,786,660 | 11/1988 | Ittmann et al. | 524/264 |
| 5,236,622 | 8/1993 | Yoneda et al. | 252/309 |

FOREIGN PATENT DOCUMENTS

| | | |
|---|---|---|
| 0114636 | 8/1984 | European Pat. Off. . |
| 0236945 | 9/1987 | European Pat. Off. . |
| WOA90/02779 | 3/1990 | WIPO . |

*Primary Examiner*—Paul R. Michl
*Assistant Examiner*—Andrew E. C. Merriam
*Attorney, Agent, or Firm*—Millen, White, Zelano & Branigan

[57] ABSTRACT

The invention relates to oxide particles which have a surface modification by covalently bonded organic groups which allow covalent bonding into polymer materials. These particles are particularly advantageous in their use as fillers or modifying agents in polymer materials, in particular polymer films.

14 Claims, No Drawings

SURFACE-MODIFIED OXIDE PARTICLES AND THEIR USE AS FILLERS AND MODIFYING AGENTS IN POLYMER MATERIALS

The invention relates to oxide particles which are surface-modified with covalently bonded specific organic groups, and to their use as fillers and modifying agents in polymer materials, in particular polymer films based on polyester.

BACKGROUND OF THE INVENTION

Polymer materials into which inorganic fillers are incorporated appear in many technical and other uses. The inorganic fillers here often not only have a substitution and dilution function, but serve to modify the polymeric matrix material in many respects or impart to its certain properties for the first time. A frequent and well-known example of this is the pigmenting of polymer materials and the objects produced therefrom with inorganic pigments for coloring and/or imparting certain optical or visually esthetic properties.

Modification of polymer materials, in particular of those based on polyester, intended for production of films is in the foreground of the present invention. Films of this type have diverse uses, for example as carrier films for magnetic recording media, such as audio, video and computer tapes and floppy disks and the like, as a dielectric in capacitors, as carrier films for reprographic purposes, such as, for example, thermal printing tapes, as embossing and release films, and last but not least as packaging material.

Films having a uniform and completely smooth surface in general have the property of adhering to themselves and to objects with which they come into contact. This results in poor slip properties, which manifest themselves adversely during winding and unwinding operations even during production and also during further processing and later use. It is generally known prior art for films and surfaces thereof to be modified by incorporation of inorganic particles such that they have a certain surface roughness appropriate for their requirements. Particles can be incorporated in appropriate dimensions and amounts at the stage of the film raw material or during film production. It is essential that in the end a sufficient amount of particles are located on or in the film surface such that they project above the plane of the surface to a certain extent and thus act as it were as spacers. In the case of magnetic recording materials, uniform slip over magnetic heads and other tape-guiding components is thus ensured. EP 257611 and EP 261430 describe, for example, such a modification of polyester films for such intended uses with $SiO_2$ particles.

However, films of the type described above have serious disadvantages. Because of only inadequate adhesion of the particles in the film surface, these are abraded away when the film is used. As a result, on the one hand the slip properties of the film deteriorate during use. On the other hand, the abrasion leads to disturbances, which is serious precisely in the case of magnetic recording media, since mechanical, electromagnetic and electronic components which come into contact with the magnetic tape can thereby be contaminated, damaged or destroyed. Thirdly, precisely in the case of very thin films, the depressions in which the particles are located or which they leave behind in the film surface after abrasion are areas of mechanical weakening or other forms of disturbance. These can lead to cracks and, in the case of magnetic tapes, additionally to disturbances in the magnetic properties going as far as a loss of information, and, in the case of capacitor films, to disturbances in the dielectric properties going as far as electrical breakdown.

Another problem is the following:

During production, the films are often subjected to mono- or biaxial stretching processes to improve their tensile and tear strength. This applies in particular to films of polyester, in particular of polyethylene terephthalate, which, with mono- or biaxial orientation, are preferred in the abovementioned uses because of superior properties with respect to tensile strength, tear strength, elasticity modulus, transparency and chemical and thermal resistance.

During stretching, the areas where the inorganic particles are located are drawn out to cavity- or trough-like depressions, in the centers of which particles with correspondingly reduced adhesion are localized. This of course leads to an increased detachment of the particles and, as a consequence, to an intensification of the abovementioned adverse effects. SEM photographs of stretched films show very clearly the drawn-out depressions with the particles and also the empty depressions, so-called "voids".

SUMMARY OF THE INVENTION

The invention was therefore based on the object of achieving an improvement in the bonding of the inorganic particles into the film material so that the abovementioned adverse effects occur to a reduced extent or no longer occur.

It has now been found that oxide particles which have a surface modification by covalently bonded organic groups and which are obtained by treatment of oxidic primary particles with a silanizing agent of the formula I $$(R^1R^2R^3)Si—(CH_2)_l—X—R^4 \quad (I)$$

wherein $R^1$ is Cl or alkoxy having 1–6 C atoms, $R^2$ and $R^3$ are alkyl having 1–6 C atoms or have the meaning of $R^1$, l is a number from 1 to 6, X is a single bond, O, NH, CONH or NHCONH, $R^4$ is

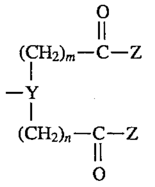

where

Y=CH or

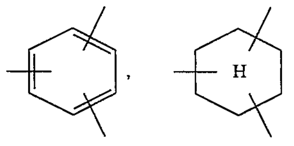

Z =OR or the two radicals Z together are —O—,>NR and m and n are numbers from. 0 to 6, or $R^4$ is $$\begin{array}{l} \quad CR'R'' \\ \quad \| \\ -C-COOR \end{array}$$

wherein X is a single bond, where R, R' and R''=H or alkyl having 1–6 C atoms, are outstandingly suitable as fillers or modifying agents for polymer materials, in particular for film production. Incorporation of the particles into the polymer material by covalent chemical bonding can be achieved by the specific surface modification of the particles. This is particularly advantageous when polymer materials containing these particles, in particular those materials based on polyester, are employed :for film production, since the abovementioned disadvantages, in particular the occurrence of "voids" in stretched films and their adverse effects, are then reduced considerably or no longer occur.

The present invention thus relates to oxide particles which have a surface modification by covalently bonded organic groups and are obtainable by a treatment of oxidic primary particles with a silanizing agent of the formula I.

The invention furthermore relates to a process for the preparation of such particles, in which an aqueous-alcoholic suspension of the oxidic primary particles is reacted with a silanizing agent of the formula I.

The invention moreover relates to the use of these particles as fillers or modifying agents in polymer materials, in particular those for the production of films, preferably based on polyester.

Finally, the invention also relates to polyester films comprising the particles characterized above as a filler or modifying material in covalently bonded form.

The oxide particles according to the invention which have a surface modification by covalently bonded organic groups are obtainable by treatment of corresponding oxidic primary particles with a silanizing agent of the formula I.

Possible base materials of the oxidic primary particles are in principle all solid inorganic oxides which are accessible to a chemical reaction on the particle surface with silanizing agents which are known per se to form covalent element-oxygen-silicon bonds. A precondition of this is the existence of free or hydrated element-O or element-OH groups on the particle surface. This applies to practically all metal oxides and some semi-metal oxides, such as $SiO_2$ and corresponding mixed systems. Preferred base materials are $SiO_2$, $TiO_2$, $ZrO_2$, $Al_2O_3$ and also $V_2O_5$, $Nb_2O_5$ and mixed systems of two or more of the abovementioned oxides. Mixed systems also include complex mineral systems, such as silicates, aluminates, aluminosilicates and the like.

Those oxidic primary particles which can be obtained as spherical, nonporous particles in a highly monodisperse form are preferred in respect of later use as fillers or modifying agents in polymer materials, in particular as modifying agents in polymer films which improve the slip properties. Oxide particles with these properties and processes for their preparation are known per se from the prior art. Oxide particles which are to be considered chiefly here are those which can be obtained by hydrolytic polycondensation from alcoholate compounds of corresponding elements, it being possible for the reaction conditions to be controlled such that they are obtained in the form of monodisperse, compact, spherical particles.

The basic reaction conditions for preparation of $SiO_2$ particles by hydrolytic polycondensation can be found, for example, from the publications W. Stöber et al. in J. Colloid and Interface Science 26, 62(1968) and 30, 568 (1969 ) and U.S. Pat. No. 3,634,588. Other particles, such as, for example, $TiO_2$ or $ZrO_2$, can also be prepared by this method. However, the particles thus prepared often show high standard deviations for the particle diameters and have a certain porosity.

For the preparation of highly monodisperse, nonporous, spherical $SiO_2$ particles which have a standard deviation of not more than 5%, reference is made to EP 0 216 278, which discloses a correspondingly adapted preparation process based on hydrolytic polycondensation. The core of this process, which is preferred for preparation of the particles according to the present invention, is a two-stage procedure. In this process, a sol or a suspension of primary particles is first formed by hydrolytic polycondensation of tetraalkoxysilanes in an aqueous-alkalineammoniacal medium, and the particles are subsequently brought to the desired final size by metered addition of further tetraalkoxysilane.

The process according to EP 0 216 278 can be applied to other oxides and also to mixed oxide systems without reservation and with the same result.

An appropriate process for the preparation of various metal oxides in the form of spherical particles of narrow particle size distribution can be found in EP 0 275 688.

A corresponding two-stage process for the preparation of different metal oxides and also mixed oxides which moreover also have glycolic groups chemically bonded to the surface is described in EP 0 391 447.

Oxide particles based on the oxides characterized above as preferred can be prepared without problems and as desired in respect of particle size, non-porosity and monodispersity by the abovementioned procedures.

Primary particles having particle diameters of 10 nm to 20 μm are preferred in respect of their later use.

The choice can initially in principle be made as from the various base materials for the oxidic primary particles and, in the case of mixed systems, the qualitative and quantitative composition thereof. However, it can also be made according to certain optical properties, predetermined where appropriate, of the filler and/or polymer material. Thus, for example, it may be desirable to adapt the optical refractive index of the oxidic particles to that of the polymer material in a predetermined manner. Reference may be made to DE 42 19 287 for the preparation of such oxide particles of adapted refractive index and their use.

The silanizing agents of the formula I to be employed for surface modification of the oxidic primary particles are structured according to the invention such that they contain those functional groups with which covalent bonding into the polymer material can be achieved. In formula I, such a group ($R^4$) which is capable of reaction with polymers and constituents or starting products thereof is accordingly bonded to the central Si atom of the organosilicon compound via a spacer grouping of 1–6 methylene units and a linking unit, which can be a single bond, oxygen or an amino, amide or urethane group. The functional group $R^4$ is structured such that it contains carboxylic acid groups or modification products thereof, such as carboxylic acid ester, carboxylic acid amide and carboxylic acid anhydride groups and/or ethylenically unsaturated groups. With respect to covalent incorporation into polymer materials based on polyester, preferred functional groups $R^4$ are those which are derived from aliphatic, cycloaliphatic or aromatic dicarboxylic acids. Possible aliphatic dicarboxylic acids on which they are based are those having up to a total of 15 C atoms. Malonic acid and succinic acid and esters, amides and anhydrides thereof are preferred. In the cycloaliphatic and aromatic dicarboxylic acids, the acid groups can in each case be separated from the alicyclic or aromatic ring by up to 6 C atoms. Phthalic acid and terephthalic acid, esters thereof and phthalic anhydride are preferred here.

If the functional group $R^4$ is derived from acrylic acid or an acrylic ester and homologs thereof, the corresponding products are preferably intended for covalent incorporation into polymer materials based on olefin polymers, such as, in particular, polypropylene, or on acrylate and vinyl polymers.

Of the remaining three radicals $R^1$, $R^2$ and $R^3$ on the Si atom of the compounds of the formula I, at least one, preferably two or all three, must be a group which can be eliminated hydrolytically, such as chlorine or alkoxy having 1–6 C atoms, but otherwise are alkyl having 1–6 C atoms. The ability to be eliminated hydrolytically determines the ability of the compounds of the formula I to form a covalent bonding link to the oxidic primary particle and thus to act as a silanizing agent. The silanizing agents of the formula I are commercially available in some cases, and can otherwise be prepared by methods known per se. Essential starting substances for the silanes derivatized with carboxylic acids are, on the one hand, mono-, di- or trichlorosilanes or mono-, di- or trialkoxysilanes, such as, for example, chlorodimethylsilane, methyldichlorosilane, trichlorosilane, trimethoxysilane, triethoxysilane, ethoxydimethylsilane and dimethoxyethylsilane. On the other hand, the essential starting substances are dicarboxylic acids or derivatives, such as, for example, malonic acid, diethyl malonate, succinic acid, succinic anhydride and 2-aminoterephthalic acid. The silane component and dicarboxylic acid component can expediently be linked by reaction, in the sense of malonic ester synthesis, with an alkenyl halide, such as, for example, 3-bromopropene, or with an alkenecarboxylic acid chloride, such as, for example, vinylacetyl chloride, and subsequent hydrosilylation.

Examples of silanizing agents of the formula I are:
diethyl triethoxysilylpropylmalonate (ethoxydimethylsilylpropyl)succinic anhydride diethyl (triethoxysilylmethyl-)succinate 4-(methyldiethoxysilyl)butanoic acid (terephthalic acid dimethyl ester)amide The surface modification of the oxidic primary particles with the silanizing agents of the formula I can be carried out in complete agreement with methods such as are customary for the preparation of silica gels usually used as chromatographic sorbents. In the simplest case, the oxidic primary particles are brought into contact directly with the silanizing agent or suspended in a solution of the silanizing agent, and the reaction is carried out under suitable conditions until substantial or complete covering of the surface with covalently bonded organic groups has taken place.

For the surface-modified oxide particles according to the invention, it has proved particularly favorable to react the primary particles in the form of an aqueous-alcoholic suspension with the silanizing agent of the formula I. This procedure is favorable because in the preferred preparation of the primary particles by hydrolytic polycondensation of alcoholate compounds of corresponding elements, the particles are obtained directly in the form of an aqueous-alcoholic suspension or are present in such a form after the customary purification steps.

The oxide particles according to the invention can advantageously be employed as fillers or modifying agents in polymer materials in all instances where surface modification with covalently bonded organic groups, in particular those which are capable of a covalent bonding link with the polymer material, is accompanied by improvements in the preparation and/or in the properties of the end product.

Particularly firm bonding of the inorganic particle and organic matrix material is achieved by the covalent bonding link between the oxide particle and polymer material. The tear or breaking strength of the polymer material or polymer product is improved considerably in comparison with a material filled with inorganic particles in accordance with the prior art. These improvements are particularly striking in polymer films, particularly in polyester films, which comprise the particles according to the invention as fillers or modifying agents in covalently bonded form. The particles here are bonded extremely firmly into the film material or in the surface region of the film. During stretching operations to generate mono- or biaxial orientation of the films, the occurrence of trough- or cavity-like depressions at areas of the film surface where particles are located is considerably reduced in degree and extent. The particles furthermore remain fixed in position considerably better, which manifests itself in a surprisingly lower abrasion of the particles from the film. As a consequence, the film retains constantly good slip properties. These two improvements in properties are of particular importance, for example, if the films are used as carrier films for magnetic tapes, where good running of the tape and a low tendency to be contaminated by particle abrasion are essential. The reduction of "voids" is also of particular importance in capacitor films, since the breakdown resistance of the film serving as the dielectric is thereby improved.

The oxide particles according to the invention can be incorporated into the particular polymer material in a manner completely analogous to that known and customary for particles according to the prior art. The process step expediently chosen for the incorporation is one in which the boundary conditions, for example in respect of temperature, are such that reaction of the functional group ($R^4$) bonded to the particle with the constituents of the polymer material or precursors thereof, such as, for example, monomers, oligomers, polymers, copolymers or polymerization catalysts, can take place. The bonding link is achieved by esterification, transesterification, polyaddition, polycondensation or olefinic polymerization, depending on the nature of the functional group $R^4$.

The incorporation and covalent bonding of the particles can accordingly be conducted at the stage of preparation of the polymer from monomeric and/or oligomeric precursors, during formulation of the raw material from which the polymeric shape body or article is then produced by methods known per se, or at the stage of production of the latter, for example by addition during extrusion of the material for shaping of the product.

In the case of film production, the filler particles are preferably added in the form of a suspension in a compatible organic solvent, such as, for example, glycol, at the stage of recipe formulation of the raw materials or during extrusion of the film raw material. The oxide particles according to the invention have the same advantageous properties here in respect of dispersibility in the suspension and/or ability to be incorporated uniformly into the polymer raw material as known oxidic fillers which have organic surface modification by conventional silanizing agents.

EXAMPLES

1. Synthesis of silanizing agents 1.1 Diethyl triethoxysilylpropylmalonate 19.1 g of sodium metal cut into small pieces are added to 128.1 g of diethyl malonate in 800 ml of dry toluene under an inert gas. The reaction is started by heating to 80°–90° C. The crystal slurry formed is dissolved by addition of ethanol.

A mixture of 106.5 g of 3-bromo-1-propene and 160 ml of toluene is added dropwise to the reaction mixture at room temperature in the course of 30 minutes, the mixture is then heated to 80° C. and this temperature is maintained for about 1 hour. The solvent is then stripped off in vacuo and the product is separated off from the solid sodium bromide which has formed using toluene. Fractional distillation of the toluene phase gives diethyl propenemalonate at 44°–50° C/0.25–0.30 tort.

61.8 g of diethyl propenemalonate are mixed with 8.2 g of triethoxysilane and 35 mg of hexachloroplatinic acid (as a catalyst) under an inert gas. The temperature rises rapidly to 90° C., while stirring, and the mixture is allowed to react completely at this temperature for a further 7 hours. The resulting deep-brown solution is subjected to fractional distillation. Diethyl triethoxysilylpropylmalonate is obtained at 115°–130° C/0.25–0.40 torr.

1.2 4-(Methyldimethoxysilyl)butanoic acid (terephthalic acid dimethyl ester)amide 110 mg of butylpyrocatechol (as a polymerization inhibitor) and 180 g of dry $Na_2CO_3$ (anhydrous) are added to 167.4 g (0.8 mol) of dimethyl aminoterephthalate in 3 1 of acetone. 89 g (0.85 mol) of vinylacetyl chloride are added dropwise to this mixture at 35°–40 ° C. in the course of 20 minutes and the mixture is then boiled under reflux for 4 hours. The filtered solution is concentrated to 1 1 and the concentrate is crystallized in the cold. The crystals of dimethyl N-butenoylaminoterephthalate isolated are recrystallized once from 1.2 1 of methanol and then from a mixture of 426 ml of ethyl acetate and 344 ml of methanol.

55.5 g (0.2 mol) of dimethyl N-butenoylaminoterephthalate are mixed with 175 mg of hexachloroplatinic acid (as a catalyst) and 85 g (0.8 mol; excess) of methyldimethoxysilane under an inert gas. Gas bubbles which form on the crystals of the catalyst indicate the immediate start of the reaction. The mixture is stirred up at short intervals of time, and after about half an hour is heated to the reflux temperature (about 60° C.) and kept under reflux for 25 hours. The reaction mixture is concentrated down to a deep-brown oil in vacuo. The oil is taken up in 400 ml of n-hexane, whereupon the product crystallizes out in the form of yellow crystals. 4-(Methyldimethoxysilyl)butanoic acid terephthalic acid dimethyl ester)amide is obtained by dissolving in hot n-hexane, crystallization in the cold and drying of the crystals in vacuo.

2. Preparation of spherical, nonporous, monodisperse $SiO_2$particles

To a mixture, thermostatically controlled at 30° C., of 600 ml of ethanol, 225 ml of water and 140 ml of 25% ammonia, a solution, adjusted to the same temperature, of 90 ml of tetraethoxysilane in 90 ml of ethanol is added all at once, while mixing intensively. The reaction mixture is stirred intensively for a further 15 seconds and then left to stand at rest for one hour.

The particles formed are present in the reaction mixture in dispersed form and are now washed free from ammonia by repeated distillation and taking up in water.

Dense, spherical particles having a particle diameter of 500±15 nm are obtained and are suspended in a mixture of water and ethanol in a volume ratio of 2: 1.5.

3. Surface modification 3.1 A mixture of 1.2 g of diethyl triethoxysilylpropylmalonate (according to 1.1) in 25 ml of ethanol is added to a suspension, obtained as under Example 2, of $SiO_2$ primary particles. The mixture is boiled under reflux for a further 6 hours, the solvent is then distilled off and the particles are washed with ethanol and dried.

Spherical, nonporous, monodisperse $SiO_2$ particles having a particle diameter of 500±15 nm and with diethyl malonate groups bonded to the surface are obtained.

3.2 A solution of 0.8 g of ethoxydimethylpropylsuccinic anhydride (manufacturer: Wacker, Burghausen) in 25 ml of ethanol is added dropwise to a suspension of $SiO_2$ primary particles obtained as under Example 2. The mixture is kept under reflux for6 hours and then worked up as under 3.1. Spherical, nonporous, monodisperse $SiO_2$ particles having a particle diameter of 500±15 nm and with succinic anhydride groups bonded to the surface are obtained.

3.3 A solution of 4-(methyldimethoxysilyl)butanoic acid (terephthalic acid dimethyl ester)amide (according to 1.2) in 20 ml of ethanol is added to an ethanolic suspension of $SiO_2$ primary particles according to Example 2. After boiling under reflux for 6 hours, the mixture is worked up as under Example 3.1. Spherical, nonporous, monodisperse $SiO_2$ particles having a particle diameter of 500±15 nm and with dimethyl terephthalate groups bonded to the surface are obtained.

We claim:

1. Oxide particles which have a surface modification by covalently bonded organic groups, obtained by treating spherical, non-porous oxidic primary particles obtained by hydrolytic polycondensation of alcoholate compounds with a silanizing agent of the formula I $$[R^1R^2R^3]Si—(CH_2)_1—X—R^4 \qquad (I)$$

wherein $R^1$ is Cl or alkoxy having 1–6 C atoms, $R^2$ and $R^3$ are alkyl having 1–6 C atoms or have the meaning of $R^1$, 1 is a number from 1 to 6, X is a single bond, O, NH, or CONH NHCONH, $R^4$ is

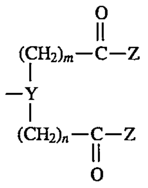

where

Y=CH,

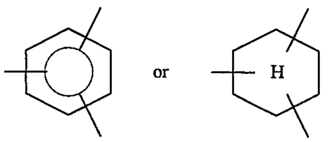

2

Z =OR or two radicals Z together are

—O—or >NR and m and n are numbers from 0 to 6.

2. Oxide particles according to claim 1, obtained from primary particles based on $SiO_2$, $TiO_2$, $ZrO_2$, $Al_2O_3$, $V_2O_5$, $Nb_2O_5$ or mixed systems thereof.

3. Oxide particles according to claim 1, obtained from oxidic primary particles having particle diameters of 10 nm to 20 μm.

4. Process for the preparation of particles according to claim 1 comprising reacting an aqueous-alcoholic suspension of the oxidic primary particles with a silanizing agent of the formula I.

5. Process according to claim 4, wherein the oxidic primary particles are spherical, non-porous primary particles in a highly monodisperse form which are obtained by hydrolytic polycondensation of alcoholate compounds of corresponding elements.

6. Process according to claim 4 wherein the oxidic primary particles have a particle diameters of 10 nm to 20 μm.

7. A material comprising a polymer and oxide particles according to claim 1.

8. The material of claim 7, wherein the polymer is a polyester.

9. Oxide particles according to claim 1, wherein at least one of $R^2$ and $R^B$ is chlorine or alkoxy of 1–6 C atoms.

10. Oxide particles according to claim 1, wherein the silanizing agent of formula I is:

diethyl triethoxysilylpropylmalonate (ethoxydimethylsilylpropyl)succinic anhydride diethyl (triethoxysilylmethyl-)succinate 4-(methyldiethoxysilyl)butanoic acid (terephthalic acid dimethylester) amide.

11. The material of claim 7, wherein the optical refractive index of the oxide particles is adapted to the optical refractive index of the polymer.

12. The material of claim 7, wherein the oxide particles are covalently bonded to the polymer.

13. The oxide particles of claim 1, wherein in the silanizing agent, Y is not CH when m +n =1 and the two radicals Z together are —O—.

14. Oxide particles according to claim 1, wherein, in the silanizing agent, Y is CH.

* * * * *